(No Model.)
D. CROWLEY.
VELOCIPEDE.
No. 295,150. Patented Mar. 18, 1884.
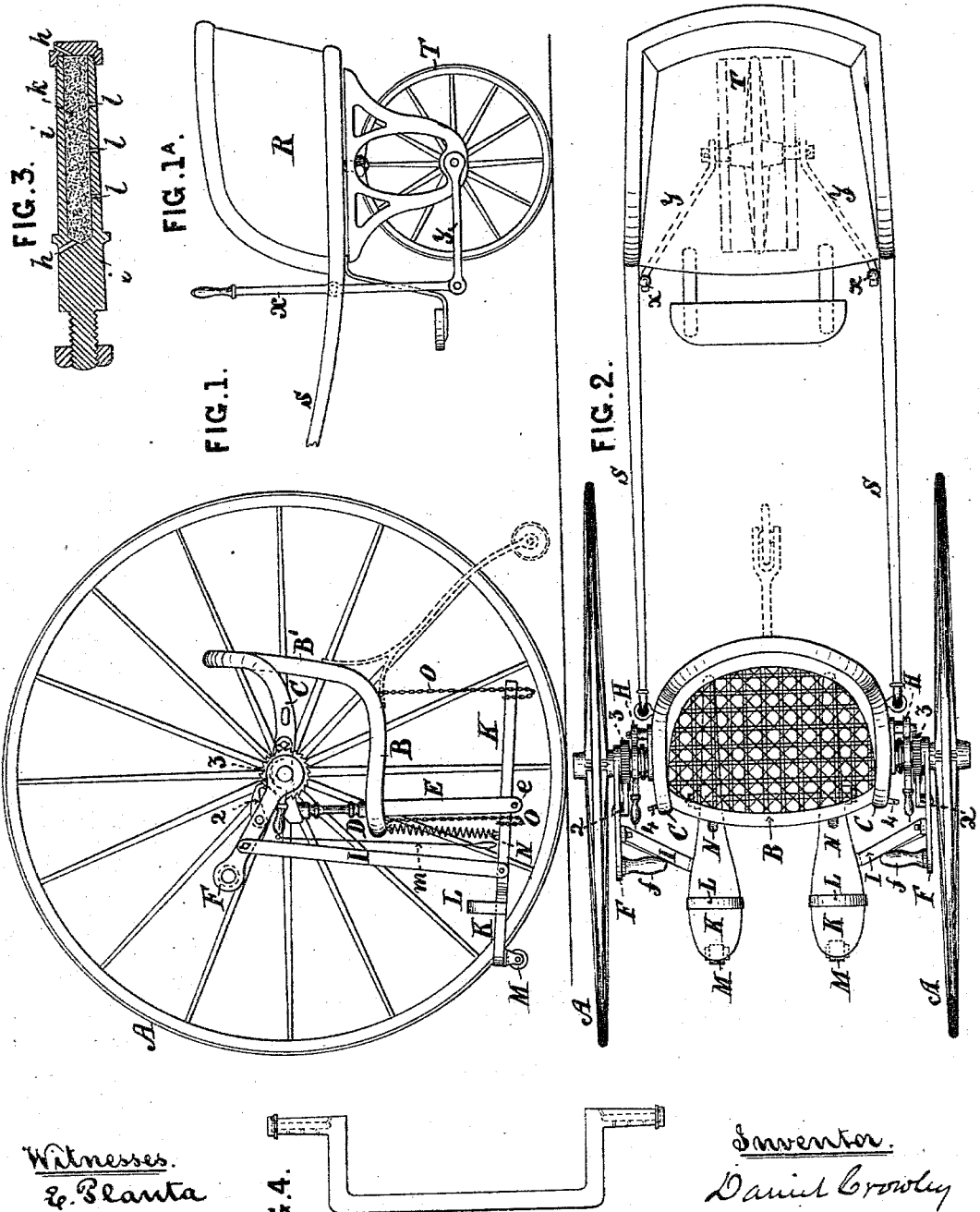

UNITED STATES PATENT OFFICE.

DANIEL CROWLEY, OF BOSTON, MASSACHUSETTS.

VELOCIPEDE.

SPECIFICATION forming part of Letters Patent No. 295,150, dated March 18, 1884.

Application filed March 9, 1883. (No model.)

*To all whom it may concern:*

Be it known that I, DANIEL CROWLEY, a citizen of Boston, residing at Boston, in the county of Suffolk and State of Massachusetts, have invented certain new and useful Improvements in Velocipedes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The nature of my invention consists of a vehicle or conveyance capable of being propelled either by the hands or feet of the occupant, or by all together, and is composed of a seat or support arranged between two wheels of considerable diameter, and so hung on the axes of the wheels that the weight of the occupant will be below the said axes, whereby the seat is rendered incapable of tipping over either in front or behind, and the vehicle can be easily operated by a man, woman, or child. To this vehicle may be attached by means of shafts at the rear an additional vehicle or annex supported upon a central caster-wheel, and provided with means for guiding the said annex, for carrying another person, or for the convenience of carrying baggage or other articles.

Referring to the accompanying drawings, Figure 1 is a side elevation of my invention, one wheel being removed. Fig. 1^A is the annex. Fig. 2 is a plan or top view of the same. Fig. 3 represents the construction of the axles. Fig. 4 is a crank shaft or axle, which may be used for the two wheels, instead of two single shafts.

A A represent two wheels, which are to be of sufficient diameter to admit of the seat being hung a proper distance below the axles to accommodate the occupant and admit of a free use of the hands and feet to propel the vehicle.

B is the seat, having a back, B', to which are attached the arms C, the latter being also connected in front to the seat B by a bar, D. The arms of the seat are supported on each side upon short axles of the wheels A A; or a crank-axle, as shown in Fig. 4, passing under the seat, may be used. Upon the axles are placed, so as to turn freely, the arms or levers F F—one on each side of the chair. To the ends of said arms F are attached handles *f f*, for operating said arms. Secured to the hubs of the wheels are ratchet-wheels 3, with which pawls 2, pivoted to the arms F, engage, so that by pushing the said arms forward by the hands the pawls will cause the hub and wheels to turn and proceed in a forward direction.

For propelling the vehicle by the feet I employ the following devices: To the lower ends of the bars E, attached to the front part of the seat B, is attached a rod, *e*, extending across the vehicle. To the rod *e* are pivoted treadles K K, provided with the foot-straps L L. Connecting rods or bars I are pivoted at their lower ends to the treadles K K, and at their upper ends to the levers F F. Springs N N are attached at their upper ends to the seat B, and at the lower ends to the treadles K K, so as to retract the pedals after they have been pressed down by the feet. It will be seen that by pressing the pedals with the feet the arm F will be drawn downward, causing the pawl 2 to turn the ratchet 3. When the treadles are released from the pressure of the foot, they will be retracted by the springs N, when the rod I and lever F will rise, causing the pawl to ride back over the ratchet-teeth to take another hold of the same.

O O are chains attached to the front and rear of the seat, respectively, and to the treadles K K, to limit the play of the treadles. Small rollers M M are connected with the front ends of the treadles, for use in case the said ends should descend low enough to touch the ground; and in case it should be thought necessary to limit the backward movement a small wheel or wheels may be attached to the rear of the seat, as indicated by dotted lines.

When only the hands are used for propelling the vehicle, the upper ends of the rods or bars I may be disconnected from the levers F and affixed to catches 4 on the arms C.

To bosses on the outer sides of the arms C C are pivoted brakes H H, which are passed in a curved form over the inner portions of the hubs, so that by pressing down the handle of the brake the speed of the vehicle may be lessened or the vehicle stopped. The brakes may be operated by the feet by means of a rod or cord, *m*, attached to the handle, and having a loop at the lower end to receive the foot.

I prefer to guide the vehicle by increasing the speed of one wheel more than the other; or it may be guided by pressing either brake in turning.

For the purpose of strengthening the axles $i$ and rendering them more durable, I construct them with a chamber extending about the length of the bearings, as shown in Fig. 3. Small holes or vents $h\ h$ are made at the inner end of the axle, and through the nut at the outer end, for the purpose of admitting oil; or the oil may be put in at the end of the axle, the nut being removed. Cotton waste or other suitable material is placed within the chamber to regulate the flow of oil, which escapes through holes $l\ l$ in the bottom of the axle, to allow the oil to pass through to the bearings.

By providing a hanging or suspended chair or seat in connection with two side wheels propelled by hand or foot, I produce a novel carriage, which is not liable to upset, inasmuch as the seat hangs or swings from a bearing so placed that the gravity of the occupant is below the axis of the wheels. Again, it is easy of propulsion, as the power is brought to bear at the center of gravity of the occupant and of the axis at one and the same time; and, further, the vehicle is easily guided, as it can be turned around within the space of its own length.

I also provide what I term an "annex," to be used in connection with the above-described vehicle when desirable for carrying more persons or for baggage. This annex consists of a chair or seat, R, supported upon one or more caster-wheels, T, controlled by a steering apparatus, $x\ y$. When one wheel only is used, I connect the annex to the main vehicle by means of two shafts, S S, and when two wheels are used I provide a single shaft, to be attached to the main vehicle.

When desirable, the lever $x$ and bar $y$ may be connected to the axle of the caster-wheel by a crank, so as to propel the annex. In this case I make use of the small wheel at the rear as a guide-wheel.

What I claim as my invention is—

1. In a two-wheeled vehicle, substantially such as described, the combination of the seat B, back B', the bars D, and the arms C C, supported directly upon the axles of the wheels A A, substantially as and for the purpose set forth.

2. The combination of the swinging seat B, the bars E, and the independently-acting treadles K, connecting-rods I I, levers F F, and the pawls and ratchets 2 3, attached, respectively, to the levers F and hubs of the wheels, as set forth.

3. The chains or cords O O, in combination with the treadles K K and the seat B, as set forth.

4. The rollers M M, in combination with treadles K K, substantially as and for the purpose set forth.

5. The brakes H, partially encircling the hubs, in combination with the rod or cord $m$, provided with a loop at its lower end, as and for the purpose set forth.

6. The combination of the annex R, caster-wheel T, rods $y$, and levers $x$, substantially as and for the purpose set forth.

7. A chair or seat, B B', having arms C C, with axles affixed thereto, substantially as set forth.

In testimony whereof I affix my signature in presence of two witnesses.

DANIEL CROWLEY.

Witnesses:
J. H. ADAMS,
E. PLANTA.